United States Patent
Baba

(10) Patent No.: US 7,913,189 B2
(45) Date of Patent: Mar. 22, 2011

(54) INFORMATION PROCESSING APPARATUS AND CONTROL METHOD FOR DISPLAYING USER INTERFACE

(75) Inventor: Tatsuru Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 11/276,206

(22) Filed: Feb. 17, 2006

(65) Prior Publication Data

US 2006/0187483 A1 Aug. 24, 2006

(30) Foreign Application Priority Data

Feb. 21, 2005 (JP) ................. 2005-044459

(51) Int. Cl.
*G06F 3/00* (2006.01)
*G06F 3/048* (2006.01)
(52) U.S. Cl. .......... 715/847; 715/745; 715/811; 715/825
(58) Field of Classification Search .................. 715/847, 715/811, 745, 825
See application file for complete search history.

(56) References Cited

U.S. PATENT DOCUMENTS

| | | | | |
|---|---|---|---|---|
| 6,046,741 A * | 4/2000 | Hochmuth | ..... | 715/704 |
| 6,114,978 A * | 9/2000 | Hoag | ..... | 341/23 |
| 6,266,060 B1 * | 7/2001 | Roth | ..... | 715/853 |
| 6,377,286 B1 * | 4/2002 | Hochmuth | ..... | 715/810 |
| 6,400,996 B1 * | 6/2002 | Hoffberg et al. | ..... | 700/83 |
| 6,567,627 B2 * | 5/2003 | Maeda et al. | ..... | 399/81 |
| 6,842,877 B2 * | 1/2005 | Robarts et al. | ..... | 715/708 |
| 7,310,636 B2 * | 12/2007 | Bodin et al. | ..... | 1/1 |
| 2003/0187958 A1 * | 10/2003 | Aoki | ..... | 709/219 |
| 2005/0015728 A1 * | 1/2005 | Ragan et al. | ..... | 715/765 |
| 2005/0054381 A1 * | 3/2005 | Lee et al. | ..... | 455/557 |
| 2006/0107219 A1 * | 5/2006 | Ahya et al. | ..... | 715/745 |
| 2006/0117271 A1 * | 6/2006 | Keim | ..... | 715/789 |

FOREIGN PATENT DOCUMENTS

| | | |
|---|---|---|
| JP | 5-246111 | 9/1993 |
| JP | 2004-007579 | 1/2004 |

* cited by examiner

*Primary Examiner* — Tadeese Hailu
*Assistant Examiner* — Nicholas S Ulrich
(74) *Attorney, Agent, or Firm* — Fitzpatrick, Cella, Harper & Scinto

(57) ABSTRACT

There are provided an image processing apparatus, an image generating apparatus, and an image processing method, capable of automating assignment of keys to functions and registration of macros provided by the image generating apparatus and presenting an index such as a shortcut key associated with one of the registered functions to a user at the timing when the user uses that function. To achieve this, first an operation command issued by a user through a control panel 1000 is received and history information about the operation command is stored in a storage device 900. A controller unit 200 detects history information about an operation command received through the control panel 1000 from among the history information, creates and registers a shortcut key for performing a operation command received through the control panel 1000 on the basis of the result of the detection, and presents the shortcut key to the user at a predetermined timing.

8 Claims, 16 Drawing Sheets

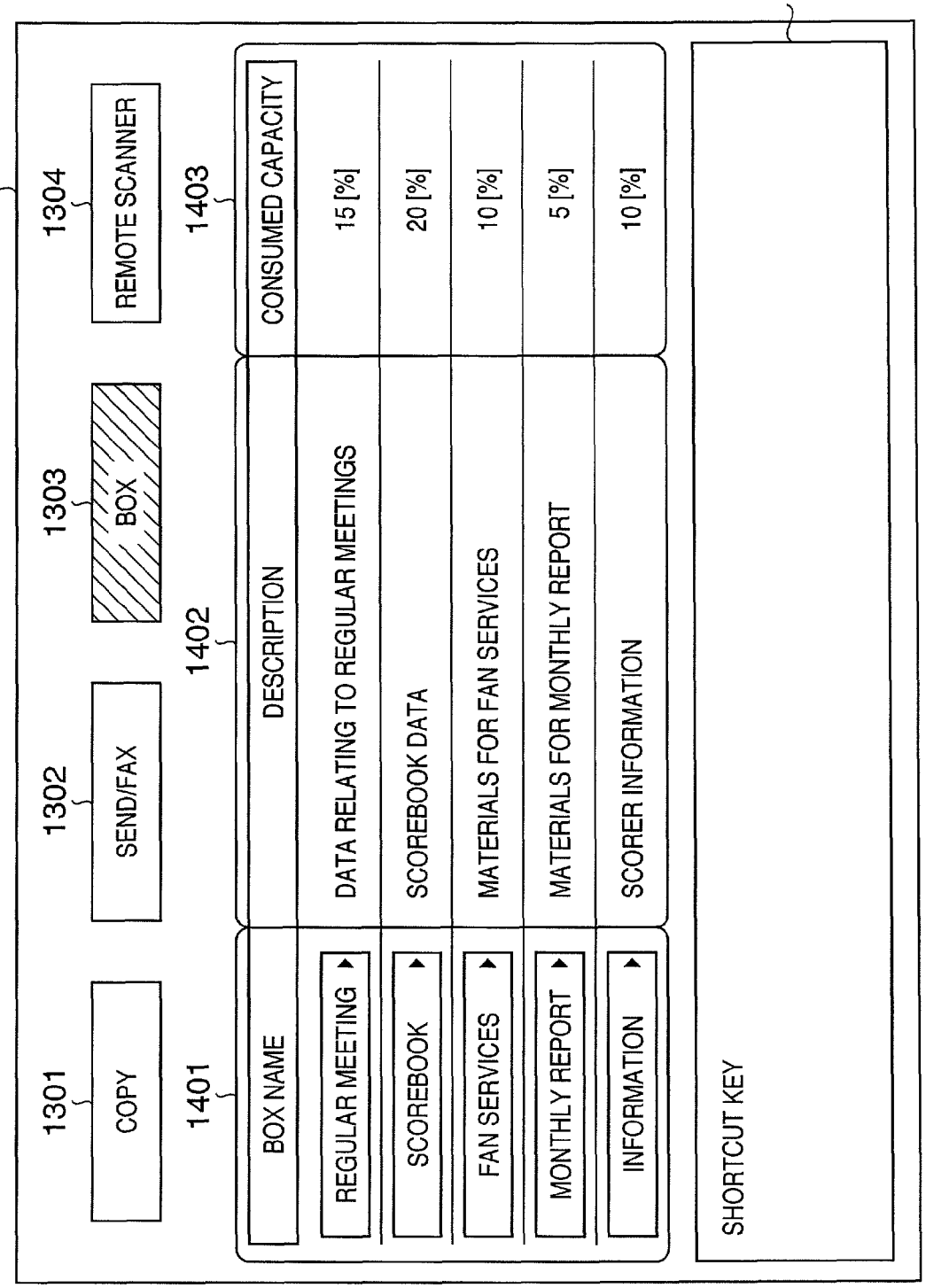

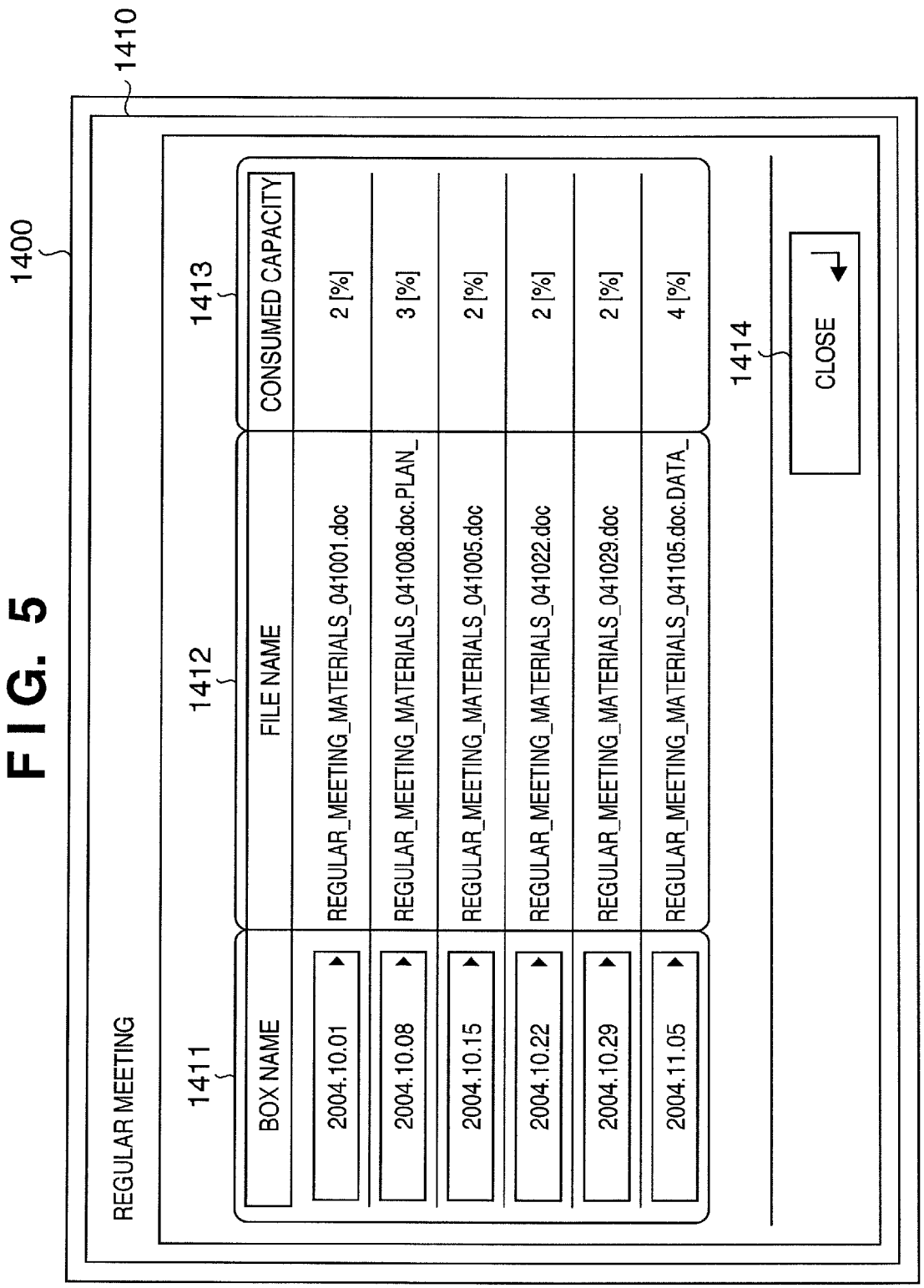

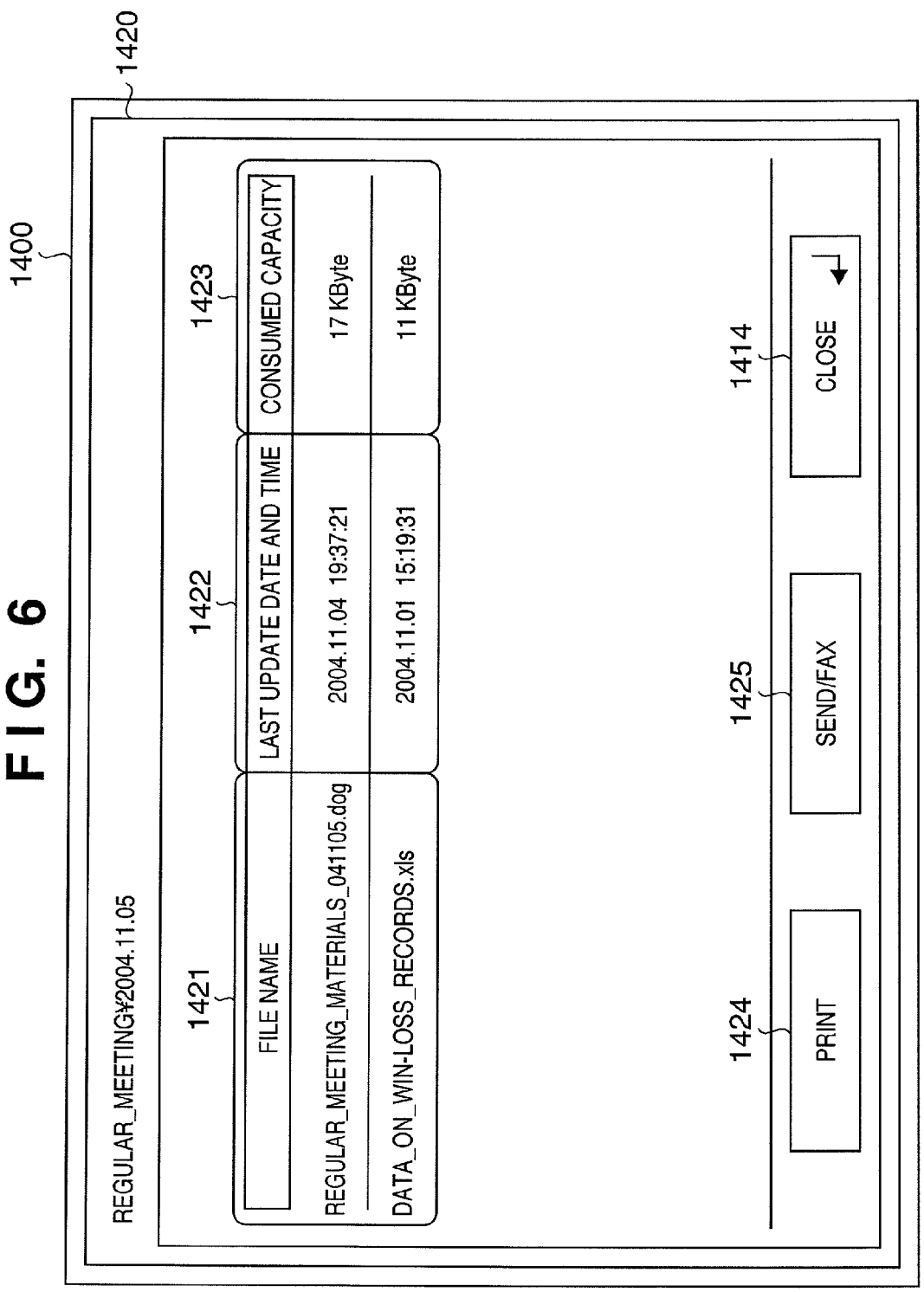

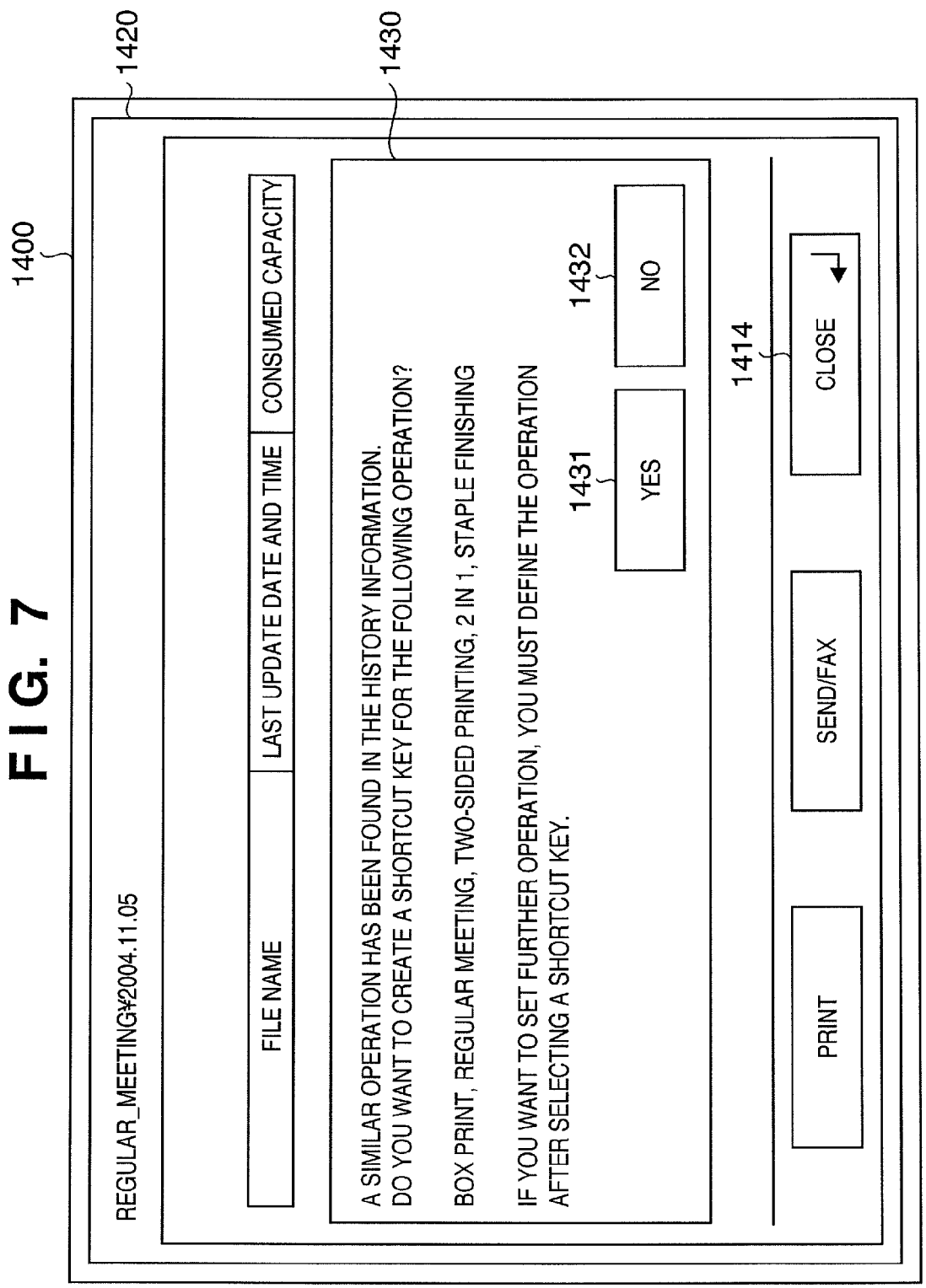

FIG. 8

| BOX NAME | DESCRIPTION | CONSUMED CAPACITY |
|---|---|---|
| REGULAR MEETING ▲ | DATA RELATING TO REGULAR MEETINGS | 15 [%] |
| SCOREBOOK ▲ | SCOREBOOK DATA | 20 [%] |
| FAN SERVICES ▲ | MATERIALS FOR FAN SERVICES | 10 [%] |
| MONTHLY REPORT ▲ | MATERIALS FOR MONTHLY REPORT | 5 [%] |
| INFORMATION ▲ | SCORER INFORMATION | 10 [%] |

COPY — 1301
SEND/FAX — 1302
BOX — 1303
REMOTE SCANNER — 1304

SHORTCUT KEY 1500
REGULAR MEETING ▲
BOX PRINTING, TWO-SIDED PRINTING, 2 IN 1, STAPLE FINISHING — 1501

HISTORY REFERENCE

USER : YAMADA TARO

| DATE | TIME | OPERATION | BOX NAME | FILE |
|---|---|---|---|---|
| 2004:10:01 | 09:43:51 | BOX, PRINT, TWO-SIDED, 2 IN 1, STAPLE FINISHING | SCOREBOOK¥2004.09 | YAMADA_0409.xls |
| 2004:10:01 | 12:53:03 | BOX, PRINT, TWO-SIDED, 2 IN 1, STAPLE FINISHING | REGULAR_MEETING¥2004.10.01 | REGULAR_MEETING_MATERIALS_041001.doc |
| 2004:10:08 | 11:57:29 | BOX, PRINT, TWO-SIDED, 2 IN 1, STAPLE FINISHING | REGULAR_MEETING¥2004.10.08 | REGULAR_MEETING_MATERIALS_041008.doc |
| 2004:10:15 | 12:47:17 | BOX, PRINT, TWO-SIDED, 2 IN 1, STAPLE FINISHING | REGULAR_MEETING¥2004.10.15 | REGULAR_MEETING_MATERIALS_041015.doc |
| 2004:10:15 | 17:13:37 | BOX, PRINT, TWO-SIDED, 2 IN 1, STAPLE FINISHING | FAN_SERVICE¥EVENT_0410 | FAN_EVENTS_0410.pdf |
| 2004:10:22 | 12:45:28 | BOX, PRINT, TWO-SIDED, 2 IN 1, STAPLE FINISHING | REGULAR_MEETING¥2004.10.22 | REGULAR_MEETING_MATERIALS_041022.doc |
| 2004:10:26 | 20:23:08 | PRINT, TWO-SIDED PRINTING, 2 IN 1 | NETWORK | TIMETABLE_0411.ppt |
| 2004:10:29 | 12:01:51 | BOX, PRINT, TWO-SIDED, 2 IN 1, STAPLE FINISHING | REGULAR_MEETING¥2004.10.29 | REGULAR_MEETING_MATERIALS_041029.doc |
| 2004:11:05 | 11:49:33 | BOX, PRINT, TWO-SIDED, 2 IN 1, STAPLE FINISHING | REGULAR_MEETING¥2004.11.05 | REGULAR_MEETING_MATERIALS_041105.doc |

INFORMATION PROCESSING APPARATUS AND CONTROL METHOD FOR DISPLAYING USER INTERFACE

FIELD OF THE INVENTION

The present invention relates to an information processing apparatus and an image generating apparatus and a control method therefor.

BACKGROUND OF THE INVENTION

Multi-function printers (hereinafter referred to as "MFPs") have been used in recent years that provide users with printing and faxing capabilities in addition to the copying capabilities of a copier. Some MFPs also have the capability of temporarily storing an image scanned through a built-in scanner or data received by facsimile and data received over a network and reading and printing or sending as an E-mail attachment the stored image or data. Such MFPs allow users to improve the productivity of their office work.

MFP manufacturers have been incorporating more and more functions in order to further improve users' productivity.

However, the multifunctionality of MFPs adds to complexity of user operations. This makes it difficult for users to fully understand a host of useful functions provided by MFPs.

Therefore, in order to improve the ease-of-use of MFPs, MFP manufactures are adding a function that allows a user to customize the layout and functions of operation keys of a user interface.

For example, an image generating apparatus is known that is capable of analyzing an operation key layout scanned through a platen glass, displaying the analyzed operation keys on a user interface, and allowing a user to select a function from a function list to assign to one of the operation keys (for example see Japanese Patent Laid-Open No. 2004-7579).

A method has been proposed for providing an MFP with a macro function of combining and assigning multiple operations together to a single operation button in order to improve the ease-of-use of the MFP. For example, an image generating apparatus is known that has a macro registration function of registering the types of pressed operation keys and the order in which they were pressed by using key codes generated when they were pressed, and executing the series of registered operations when a call key is pressed (for example see Japanese Patent Laid-Open No. 5-246111).

However, even if an MFP is provided with the functions of customizing the layout and functions of operation keys of the user interface and registering a series of complex operations as a macro, a user who does not know that the MFP includes those functions would not use them.

Moreover, even if an MFP includes the function of registering complex operations as a macro to simplify the operations as described above and a user knows the provision of that function, the user him/herself must learn how to use the new function for simplifying operations. That is, even if the MFP includes the functions of assigning keys to the above-mentioned functions and registering macro functions, the user can only use those functions after manually performing key assignment and macro registration.

Therefore, users who consider that learning new functions of an MFP is a complicated task may not be able to use such functions of the MFP and therefore cannot improve the user's productivity.

SUMMARY OF THE INVENTION

The present invention has been proposed to solve the conventional problems, and has as its objects to provide an image processing apparatus, an image generating apparatus, and an image processing method, capable of automating assignment of keys to functions and registration of macros provided by the image generating apparatus and appropriately presenting indexes such as shortcut keys corresponding to the registered functions to a user at the timing when the user uses them.

To achieve the objects, the present invention provides an information processing apparatus which performs processing in accordance with an operation command from a user, including:

receiving unit configured to receive an operation command from the user;

storing unit configured to store history information concerning the operation command;

detecting unit configured to detect, on the basis of an operation command received by the receiving unit, history information about an operation command relating to the operation command from among the history information stored in the storing unit; and registering unit configured to register an index for executing an operation command received by the receiving unit, on the basis of the result of detection by the detecting unit.

To achieve the objects stated above, the present invention also provides an image generating apparatus which generates an image in accordance with an operation command from a user, including:

receiving unit configured to receive an operation command concerning image generation from a user;

storing unit configured to store history information about the operation command;

detecting unit configured to detect, on the basis of an operation command received by the receiving unit, history information about an operation command relating to the operation command from among the history information stored in the storing unit; and registering unit configured to register an index for executing an operation command received by the receiving unit, on the basis of the result of detection by the detecting unit.

To achieve the objects stated above, a method for controlling an information processing apparatus according to the present invention includes the steps of:

receiving an operation instruction relating to image processing from a user;

detecting, on the basis of an operation command received in the receiving step, history information about an operation command relating to the operation command from among the history information about operation commands received in the receiving step in the past; and registering an index for executing an operation command received in the receiving step, on the basis of the result of detection in the detecting step.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 4 shows an exemplary configuration of a box manipulation user interface screen according to the first embodiment of the present invention;

FIG. 5 shows another exemplary configuration of the box manipulation user interface screen according to the first embodiment of the present invention;

FIG. 6 shows an exemplary configuration of a file manipulation user interface screen according to the first embodiment of the present invention;

FIG. 7 shows an exemplary configuration of a screen for confirming the creation of a shortcut key according to the first embodiment of the present invention;

FIG. 8 shows an exemplary configuration of a box manipulation user interface screen after a shortcut key is created according to the first embodiment of the present invention;

FIG. 10 shows an example of a history reference screen presenting a history of use by a user according to the first embodiment of the present invention;

DETAILED DESCRIPTION OF THE PREFERRED EMBODIMENTS

A configuration and operation of an image generating apparatus according to embodiments of the present invention will be described below in detail with reference to the accompanying drawings. The embodiments will be described with respect to a multi-function printer (MFP) which provides a user with copying, printing, faxing capabilities, and the capability of temporality storing scanned image, and data received by facsimile and data received over a network and printing or sending as E-mail attachments the data.

First Embodiment

A first embodiment will be described below in detail with reference to the accompanying drawings.

Figure 14:
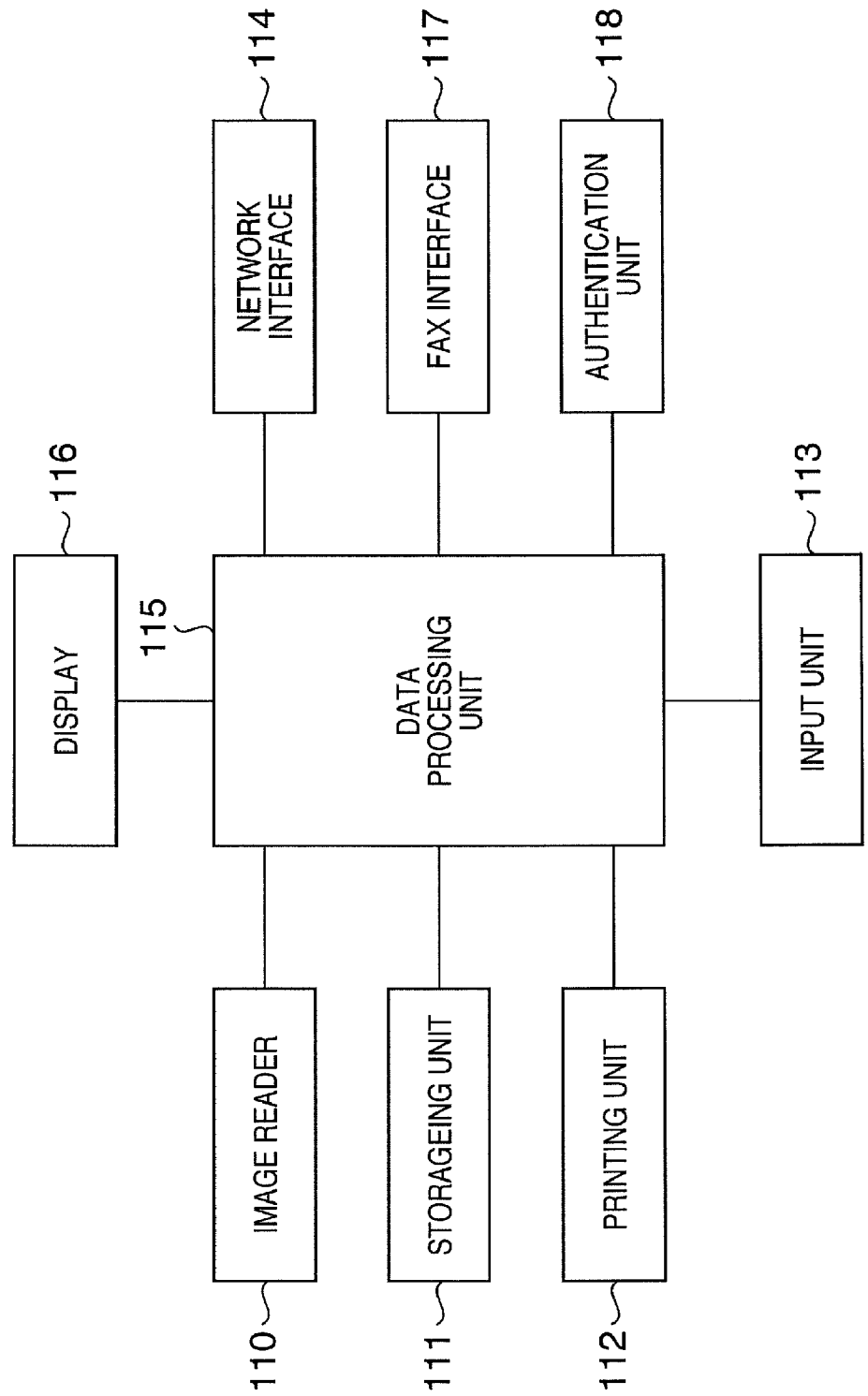
FIG. 14 is a block diagram showing a configuration of the MFP 100 according to the first embodiment of the present invention.

FIG. 14 is a block diagram showing a configuration of an MFP 100 according to the first embodiment of the present invention. An operator command to the MFP 100 is entered by means of an input unit 113 such as keys provided on the MFP 100 or a personal computer, not shown, connected to the MFP 100 through a network such as a LAN and the series of operations is controlled by a controller in a data processing unit 115.

Reference numeral 118 in FIG. 14 denotes an authenticating unit which prompts a user to input authentication information (for example a personal ID or a password). The authenticating unit 118 determines whether or not to permit the user to access the MFP 100 on the basis of the authentication information such as the user's personal ID and password input through the input unit 113 or other input source. If the user is identified as being authorized to access from the result of authentication by the authenticating unit 118, an image reader 110 including an auto document feeder (hereinafter abbreviated to "ADF") initiates scanning of an original. In particular, the image reader 110 illuminates one or more original images with a light source provided in the MFP 100 to form a reflected image of the original image on a solid-state image sensing device through lenses and obtains a raster scan image signal from the solid-state image sensing device as image information with the density of, for example, 600 dpi. When an ordinary copy function is used, the image signal undergoes image processing in the data processing unit 115 and converted into a record signal. If multiple copies of the original image are to be reproduced, one page of the record data is first stored in a storage unit 111 and then the multiple copies are successively outputted to a printing unit 112 to form the image on paper sheets.

On the other hand, print data inputted into the MFP 100 over a network through a network interface 114 is provided to the data processing unit 115, where it is converted into recordable raster data, and is then outputted to the printing unit 112 where the data is formed on paper as a recorded image.

The status of an inputted operation and image data currently being processed are displayed on a display unit 116 of the MFP 100 or on a monitor of a personal computer (PC), not shown, connected to the MFP 100 through a network. The storage unit 111 stores image data read by the image reader 110 and subjected to data processing by the data processing unit 115. The storage unit 111 can be controlled from the PC connected through the network as well, and transmission and reception and control of data between the MFP 100 and the PC is performed through the network interface 114.

Scanned data is sent to a destination specified by means of a facsimile (FAX) interface 117. Data received through the FAX interface 117 is printed by using the printing unit 112. The data received by fax can also be transferred to a destination specified through the network interface 114. Furthermore, data received through the network interface 114 can be transferred through the FAX interface 117.

Figure 15:
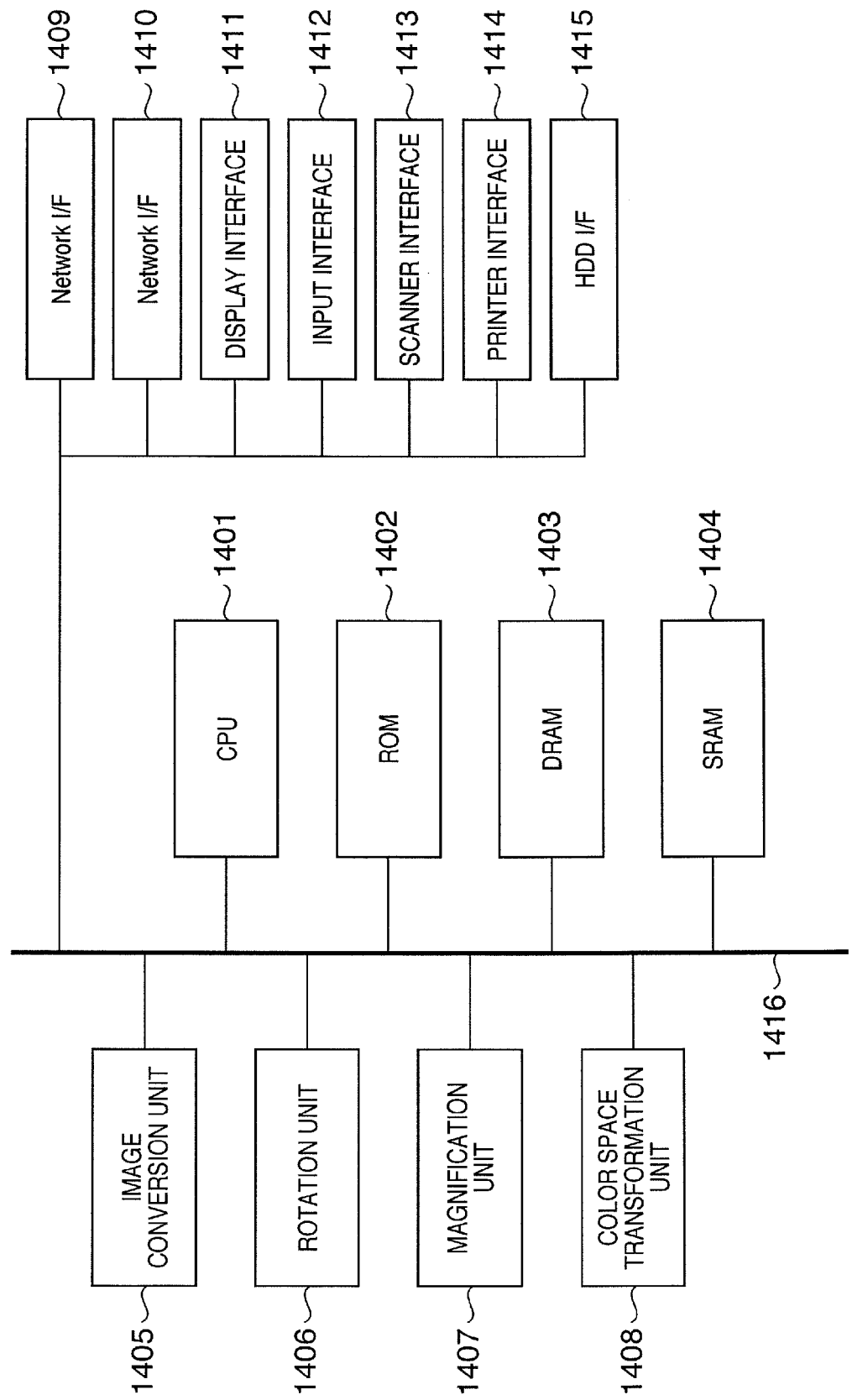
FIG. 15 is a block diagram showing details of a data processing unit 115 in the MFP 100 according to the first embodiment of the present invention.

FIG. 15 is a block diagram showing a detailed configuration of the data processing unit 115 in the MFP 100 according to the first embodiment of the present invention. As shown in FIG. 15, the data processing unit 115 includes a CPU 1401. The CPU 1401 reads and executes a program stored in a ROM 1402 to perform various functions included in the MFP 100.

In FIG. 15, reference numeral 1403 denotes a DRAM required for such operations and used as a working memory required for running a program or an image memory for storing images. Reference numeral 1404 denotes an SRAM used for storing data to be backed up. Reference numeral 1405 denotes an image conversion unit which converts multi-valued data to binary data and vise versa. Image data from the DRAM 1403 is inputted into the SRAM 1404 through a data bus 1416 and the converted image data is written back to the DRAM 1403. Reference numeral 1406 denotes a rotation unit, 1407 denotes magnification unit, and 1408 denotes color space transformation unit.

The data processing unit 115 further includes network interfaces 1409 and 1410 connected to the network interface 114 and FAX interface 117, respectively. A display interface 1411 is connected to the display unit 116. Further, an input interface 1412 is connected to the input unit 113. A scanner interface 1413 is connected to the image reader 110. A printer interface 1414 is connected to the printing unit 112. A hard disk drive (HDD) interface 1415 is connected to the storage unit 111.

An image read by the image reader 110 is stored in the DRAM 1403 through the scanner interface 1414. Then, the image conversion unit 1405, rotation unit 1406, magnification unit 1407, color space transformation unit 1408, which perform image processing, and CPU 1401 are used to process the image in the DRAM 1403 according to a mode specified through the input unit 113 and the processed image is sent through the network interface 1409 from the network interface 114 or printed in the printing unit 112 through the printer interface 1414. At the same time, the image is also stored in the storage unit 111 through the HDD interface 1415.

Data from the network interface 1409 is received and stored in the DRAM 1403 and the storage unit 111. The image in the DRAM 1403 is converted by using the image conversion unit 1405, rotation unit 1406, magnification unit 1407, and color space transformation unit 1408, which perform image processing, and the CPU 1401, and the converted image is sent back to the network interface 1409 or is sent to the printer interface 1414, where it is printed.

Figure 1:
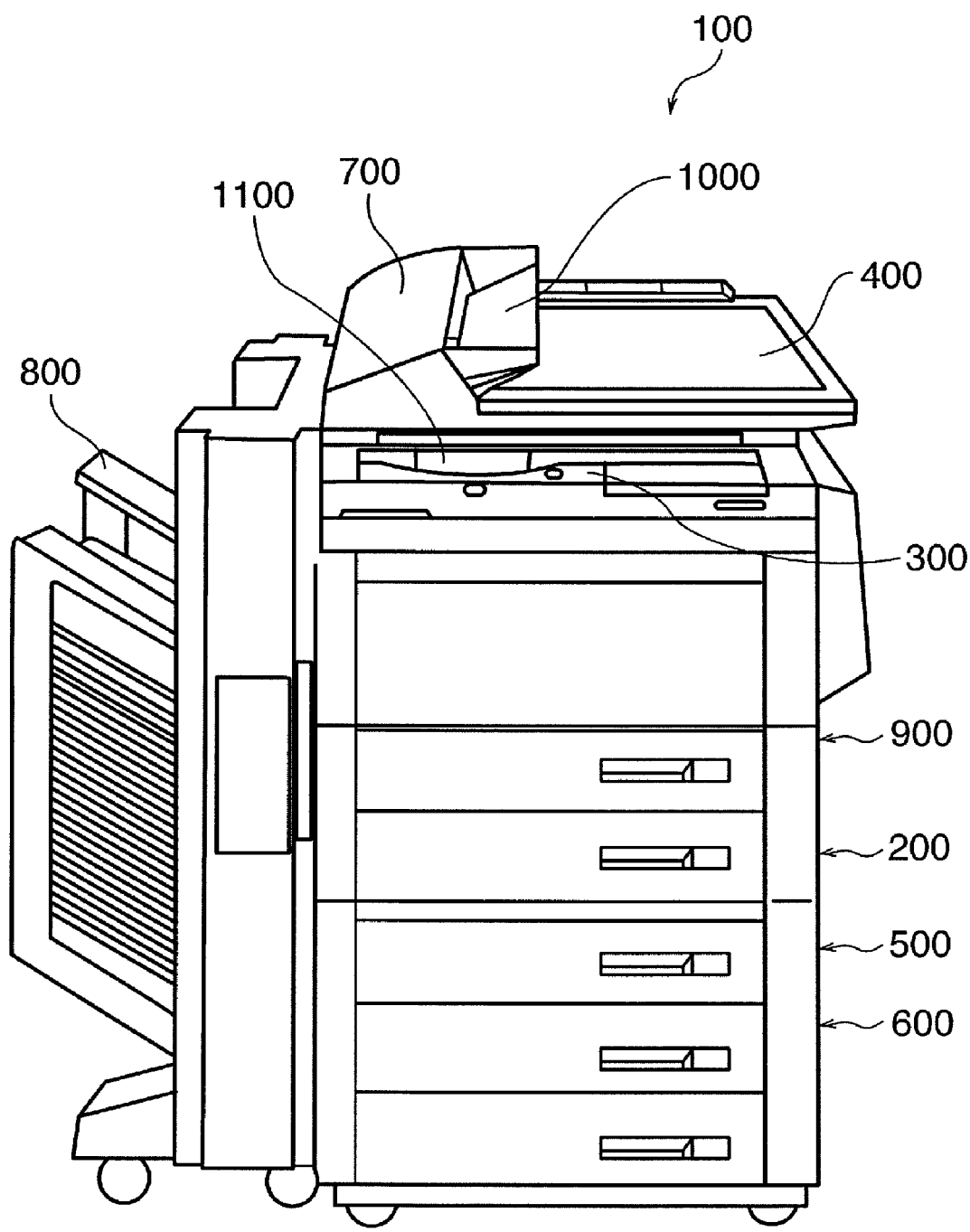
FIG. 1 is a diagram showing an entire system which implements an MFP according to a first embodiment of the present invention.

FIG. 1 shows an entire system which implements the MFP 100 according to the first embodiment of the present invention. As shown in FIG. 1, provided at the top of the MFP 100 according to the first embodiment is a scanner 700, which implements the image reader 110 described above. Provided at the top of the scanner 700 is an auto document feeder (ADF) 300 for loading originals. When originals are loaded in the ADF 300 and a scan operation is performed, the scanner 700 reads them one by one and ejects the scanned originals onto a platen cover 400.

Figure 2:
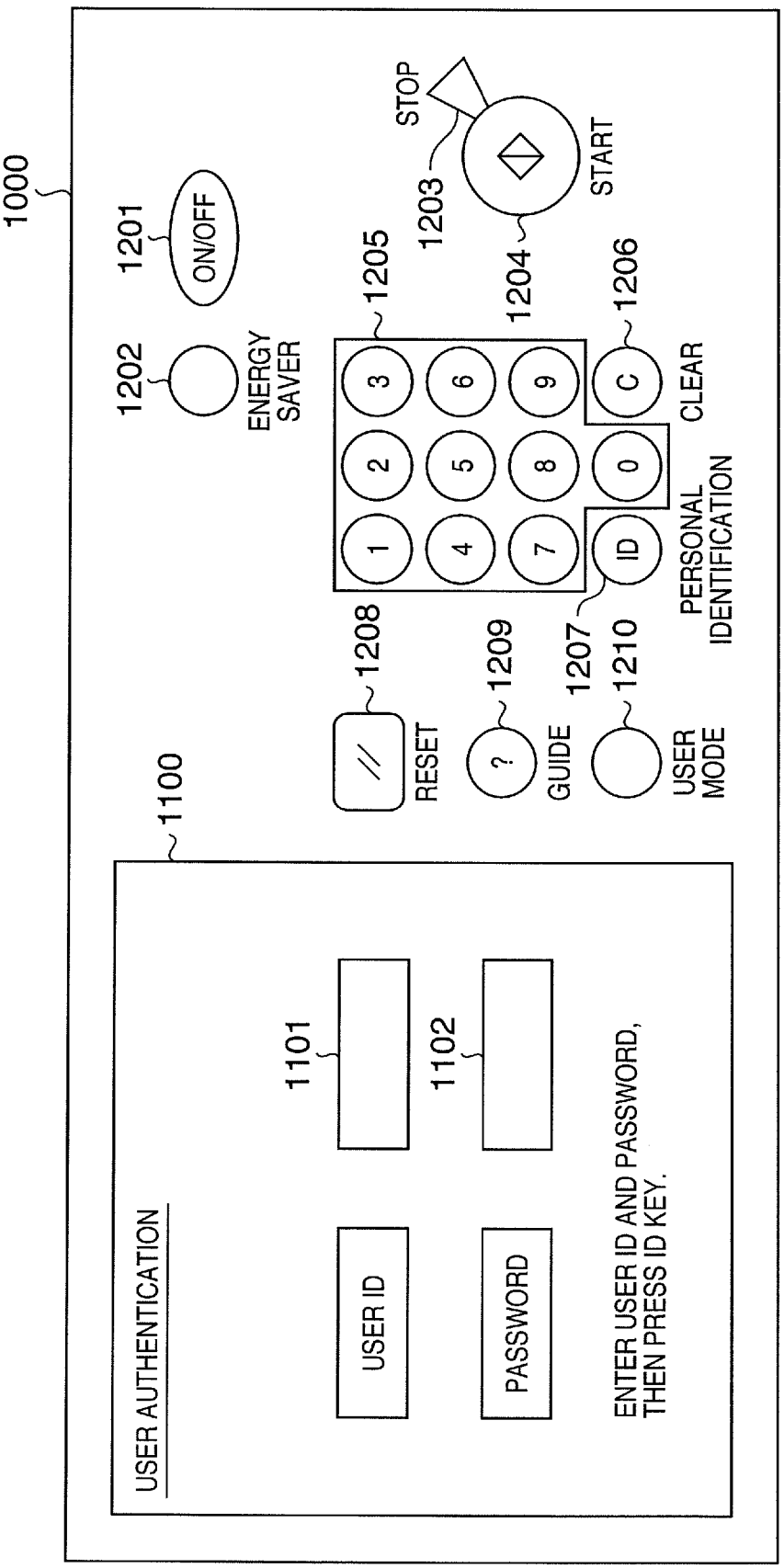
FIG. 2 shows an exemplary configuration of a control panel which is a user interface of the MFP according to the first embodiment of the present invention.

FIG. 2 shows an exemplary configuration of a control panel, which is a user interface of the MFP 100 according to the first embodiment of the present invention. Scanning of originals described above is started when a start key 1204 on the control panel 1000 shown in FIG. 2 is pressed.

The platen cover 400 used for holding down originals is provided below the ADF 300. To copy a single sheet of original, a user lifts the platen cover 400 and the ADF 300, places the original on a glass panel of the scanner 700, and lowers the platen cover 400 or the ADF 300 to hold down the original, and then presses the start key 1204 on the control panel 1000.

The number of copies and various types of operations can be specified by pressing keys of a ten-key keypad 1205 on the control panel 1000. A liquid-crystal monitor 1100 is provided on the control panel 1000 which displays the status of a specified operation and also functions as a touch panel through which a user inputs an selection or command.

Provided on the rear of the MFP 100 are a network port 500, which implements the network interface 114, and a FAX port 600, which implements the FAX interface 117. When a print job is issued from driver software of a PC (not shown) connected through a network and is received by the MFP 100, printing is initiated. Printed sheets are ejected onto a side tray 800.

Data read by the scanner 700 of the MFP 100 can not only be copied, but can also be attached to E-mail as an attached file and sent to a PC (not shown) through the network port 500 or be stored in a storage device 900, which is implemented by the storage unit 111. Furthermore, according to the first embodiment, the storage device 900 is a hard disk drive and a directory called a "box" can be created on the storage device 900 in which files of various types can be stored.

When receiving a FAX signal through the FAX port 600, the MFP 100 can perform print processing as in the case of a printer job. FAX data received can be attached to E-mail as an attached file and sent to a PC (not shown) through the network port 500, or can be stored in a box. All of these functions are centrally controlled by a controller unit 200.

As shown in FIG. 2, provided on the control panel 1000 functioning as a user interface are the liquid-crystal monitor 1100, power key 1201, energy saver key 1202, stop key 1203, start key 1204, ten-key keypad 1205, clear key 1206, Personal identification key 1207, reset key 1208, guide key 1209, and user mode key 1210. The control panel 1000 implements the display unit 116 and input unit 113 described above.

The power key 1201 is used for powering on and off the MFP 100. The energy saver key 1202 is used for instructing the MFP 100 to enter a low-power-consumption mode. The stop key 1203 is used for stopping a job being performed on the MFP 100. The start key 1204 is used for instructing the MFP 100 to initiate a job. The ten-key keypad 1205 is used for inputting numeric parameters used in a job performed on the MFP 100. The clear key is used for clearing job parameters inputted by a user.

The Personal identification key 1207 is used for instructing the MFP 1000 to perform user authentication when the MFP 100 in a security mode for restricting the use of the MFP 100 to particular users. The reset key 1208 is used for resetting settings of the MFP 100 inputted parameters or the like. The guide key 1209 is used for instructing the MFP 100 to enter a guide mode for explaining functions of the MFP 100 to a user. The user mode key 1210 is used for indicating to the MFP 100 the start of customizing of the MFP 100 to meet the needs or preference of a user. The liquid-crystal monitor 1100 displays to a user a menu of features provided by the MFP 100.

The liquid-crystal monitor 1100 in the first embodiment has touch-sensitive panel capability. Accordingly, a user can operate the MFP 100 by touching a menu displayed on the liquid-crystal monitor 1100. The liquid-crystal monitor 1100 displays various kinds of information. The state of the liquid-crystal monitor 1100 specifically shown in FIG. 2 is the initial state of the MFP 100, from which a user undergoes user authentication and then can instruct the MFP 100 to perform a desired operation by touching a button.

A window indicating the user authentication mode is displayed on the liquid-crystal monitor 1100 in FIG. 2. In this window, the ID of a user who wants to use the MFP 100 is entered in a user ID entry field and the password of the user is entered in a password entry field 1102. In particular, when a user wants to use the MFP 100, the user first touches the user ID entry field 1101 and enter a user ID through the use of the ten-key keypad 1205. The user then touches the password entry field 1102, enters a password through the ten-key keypad 1205, and then presses the Personal identification key 1207 to initiate user authentication.

Figure 3:
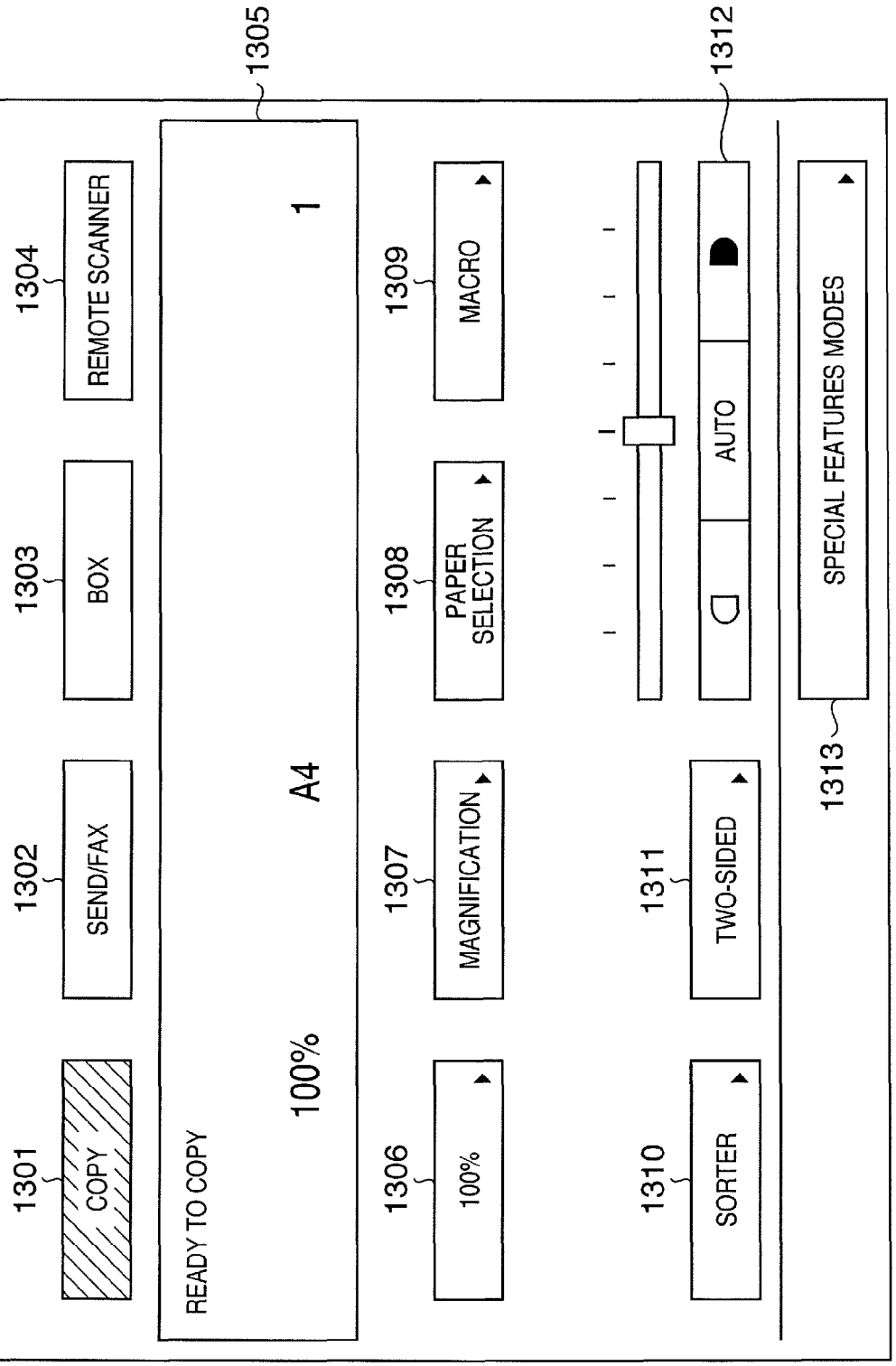
FIG. 3 shows an example of a basic screen displayed on a liquid-crystal monitor 1100 on the control panel 1000 which is the user interface according to the first embodiment of the present invention.

FIG. 3 shows an example of a basic screen displayed on the liquid-crystal monitor 1100 of the control panel 1000, which is a user interface according to the first embodiment of the present invention. The basic screen 1300 of the user interface shown in FIG. 3 is displayed on the liquid-crystal monitor 1100 after user authentication shown in FIG. 2 is successfully performed.

Displayed on the basic screen 1300 of the user interface are a Copy mode key 1301, a Send/FAX mode key 1302, a Box mode key 1303 a Remote scanner mode key 1304, a status window 1305 displaying the status of the MFP 100, a 100% scale key 1306, a Magnification key 1307, a Paper selection key 1308, a macro key 1309, a sorter key 1310, a Two-sided printing key 1311, a print density adjustment bar 1312, and a Special features modes key 1313.

The Copy mode key 1301 is touched by a user to use the MFP 1000 to perform copying. The Send/FAX mode key 1302 is touched by a user to send image data digitized by the scanner (image reader 110) by E-mail or by facsimile. The Box mode key 1303 is touched by a user to store image data scanned and inputted by the scanner (image reader 110) in a box in the hard disk (storage unit 111) built in the MFP 100 or to print out or send by E-mail or by facsimile image data already stored in a box.

The Remote scanner mode key 1304 is touched by a user to use the scanner (image reader 110) provided in the MFP 100 through a local area network 400. The status window 1305 indicates the current status of the MFP 100. The status window 1305 in FIG. 3 in particular indicates that the current mode is copy mode, the copy ratio is 100%, the paper size is A4, and the number of copies is one. The 100% scale key 1306 is used for setting the copy ratio to 100%. The Magnification key 1307 is used for changing the copy ratio to 25, 50, 61, 70, 81, 86, 115, 122, 141, 200, or 400 (%), for example.

The macro key 1309 is used for setting and invoking a macro. The sorter key 1310 is used for specifying a finishing function performed when printed sheets are outputted to a finisher, such as collating or grouping printed sheets, offset stacking of printed sheets, or stapling a stack of printed sheets. The Two-sided print key 1311 allows for specifying two-sided copying such as from single-sided originals to two-sided copies or two-sided originals to two-sided copies. The print density adjustment bar 1312 can be used to adjust the print density of a copied image. The Special features mode key 1313 allows an option to be specified such as a 2-in-1 print function which prints 2 pages on 1 page, booklet printing, the function of copying originals of different sizes, monocolor printing, adjustment of image quality, or specifying a print area.

FIG. 4 shows an exemplary configuration of a box manipulation user interface screen according to the first embodiment of the present invention. In FIG. 4, a box titled "Regular meeting" is displayed. The box manipulation user interface screen 1400 is displayed on the liquid-crystal monitor 1100 when the Box mode key 1303 shown in FIG. 3 is pressed. A box name column 1401 displays the names of boxes, each of which is set for each user. The user can select one of the displayed box names to access the data stored in the box. The box description column 1402 displays the descriptions of listed boxes, which is set by the user when or after creating the boxes. The consumed box capacity column 1403 displays the consumed capacity of each box in percent figures. The shortcut key display area 1401 displays a shortcut key created.

FIG. 5 shows another exemplary configuration of the box manipulation user interface screen according to the first embodiment of the present invention. The box manipulation user interface screen 1410 in FIG. 5 appears on the liquid-crystal monitor 1100 when the box key 1401 (Regular meeting) on the screen shown in FIG. 4 is pressed. The box name 1411 displays names of boxes which are set one level below the box selected by pressing the box key 1401 in FIG. 4. A user can press the box name 1411 to display boxes set one level below that box, or files contained in that box.

The file name 1412 in FIG. 5 displays the name of files contained in each box displayed in the box name 1411. The consumed capacity 1413 indicates the consumed data capacity of each box in percent figures. The "Close" key 1414, when pressed by a user, allows the user to return to the box manipulation user interface screen 1400 shown in FIG. 4.

FIG. 6 shows an exemplary configuration of a file manipulation user interface screen according to the first embodiment of the present invention. The exemplary configuration of the file manipulation user interface screen 1420 in FIG. 6 appears on the liquid-crystal monitor 1100 when the box key 1411 (which is displayed with the box name "2004.11.05" in the example of the first embodiment) in FIG. 5 is pressed. The file name 1421 displays the name of files contained in a box selected by a user.

The last update date and time 1422 in FIG. 6 displays the date and time at which the file was last updated by a user. The consumed capacity 1423 indicates the consumed data capacity of each file in kilobytes. The print key 1424 prints a file associated with a file name 1421 selected by a user. The Send/FAX key 1425 sends a file associated with a file name 1421 selected by a user by E-mail or by facsimile. In the first embodiment, when a file is to be printed or sent by E-mail or facsimile, the file may be selected before making settings for the printing or sending by mail or facsimile, or settings for the printing or sending may be made before selecting the file.

FIG. 7 shows an exemplary configuration of a screen for confirming creation of a shortcut key according to the first embodiment of the present invention. The shortcut key creation confirmation screen 1430 in FIG. 7 is displayed if an operation routinely performed by a user is detected, and asks the user whether the user wants to assign the detected routine operation to a shortcut key. If the user wants to create a shortcut key, then the user presses the "Yes" key 1431; otherwise, the user presses the "No" key 1432. How a routinely performed operation is detected will be described later.

FIG. 8 shows an exemplary configuration of the box manipulation user interface screen after a shortcut key is created according to the first embodiment of the present invention. As shown in FIG. 8, a created shortcut key 1500 is displayed in the shortcut key field 1404. The description 1501 of the shortcut key indicates characteristic functions performed when the shortcut is used. The user can press the shortcut key 1500 to see the details of the operation performed with the shortcut key and cause the operation to be executed.

Figure 9:
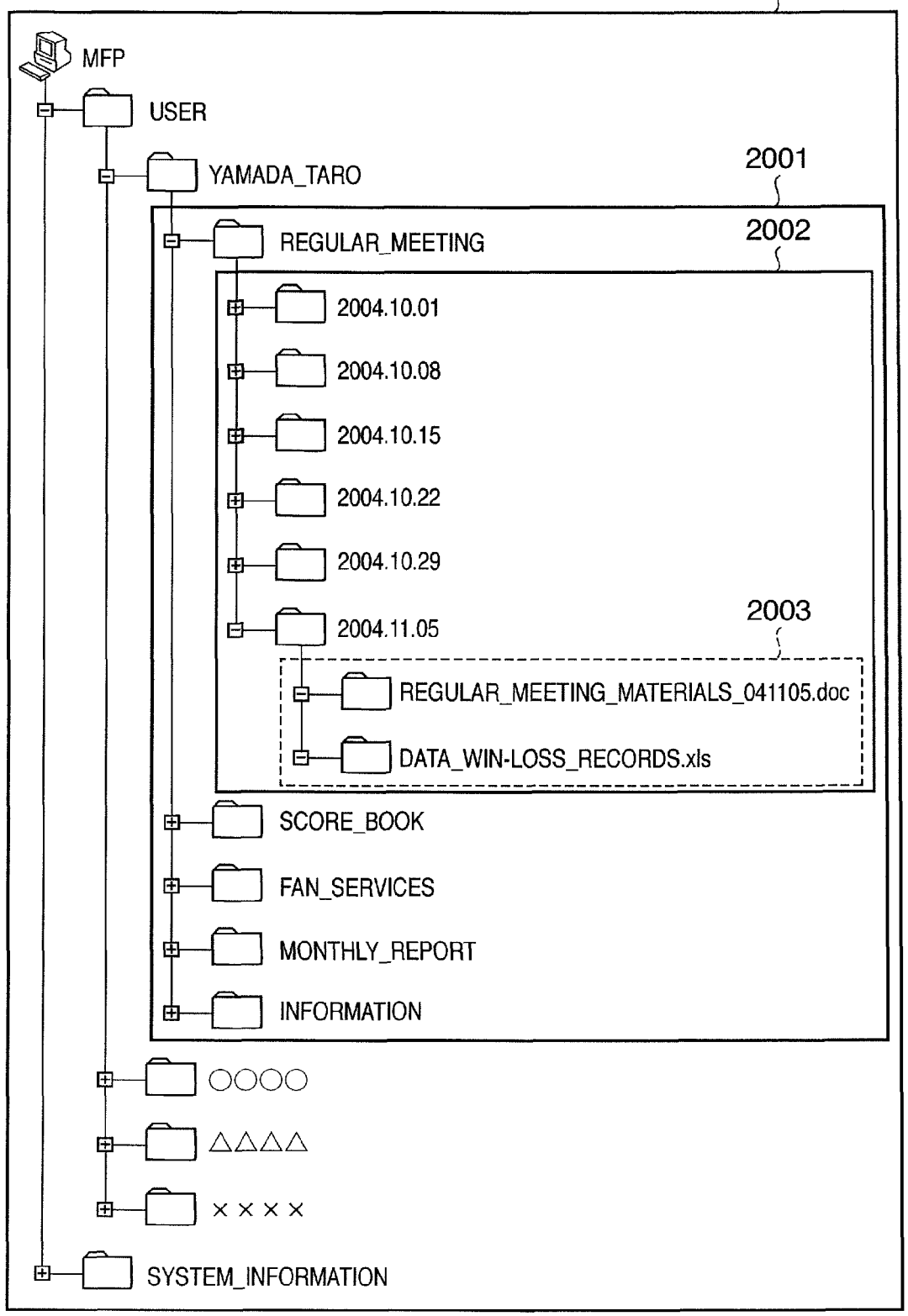
FIG. 9 shows an exemplary configuration of a hierarchical structure of boxes according to the first embodiment of the present invention.

FIG. 9 shows an example of a box hierarchical structure according to the first embodiment of the present invention. The hierarchical box structure 2000 shown in FIG. 9 shows a box structure having the MFP at the top. When a user presses the Box mode key 1303 after successful user authentication, boxes set for the authenticated user are displayed in the box name column 1401. It is assumed in the example of the first embodiment of the present invention that a user "Yamada Taro" has been authenticated. Therefore, the boxes 2001 set for "Yamada Taro" is shown in the box manipulation user interface screen 1400 in FIG. 4. In the box manipulation user interface screen 1410 in FIG. 5, the boxes 2002 set in the box "Regular meeting" are displayed. In the file manipulation user interface screen 1420 in FIG. 6, files 2003 stored in the box "2004.11.05" are displayed.

FIG. 10 shows an example of a user's use history reference screen according to the first embodiment of the present invention. The user's use history reference screen 2100 in FIG. 10 displays a history of operations performed on the MFP by a user. The date column 2101 displays the dates on which the user operated the MFP. The time column 2102 displays the times at which the user operated the MFP. The operation column 2103 displays operations performed on the MFP by the user. In the example of the first embodiment, the operation column 2103 contains, in addition to the operations (box, print, and the like) specified by the user, settings (such as two-sided, 2 in 1 printing, and staple finishing) used by the user in the operations.

The referenced box name column 2104 displays the box names accessed by the user. The referenced file name column 2105 displays the file names accessed by the user. The MFP 100 according to the first embodiment of the present invention internally maintains a user's use history information so that an administrator can check it on an administration server (not shown) or a PC (not shown) when needed. In that case, the user's use history reference screen 2100 is displayed. The user's use history information is also used for determining whether or not a user operation is a routinely performed operation.

Figure 11:
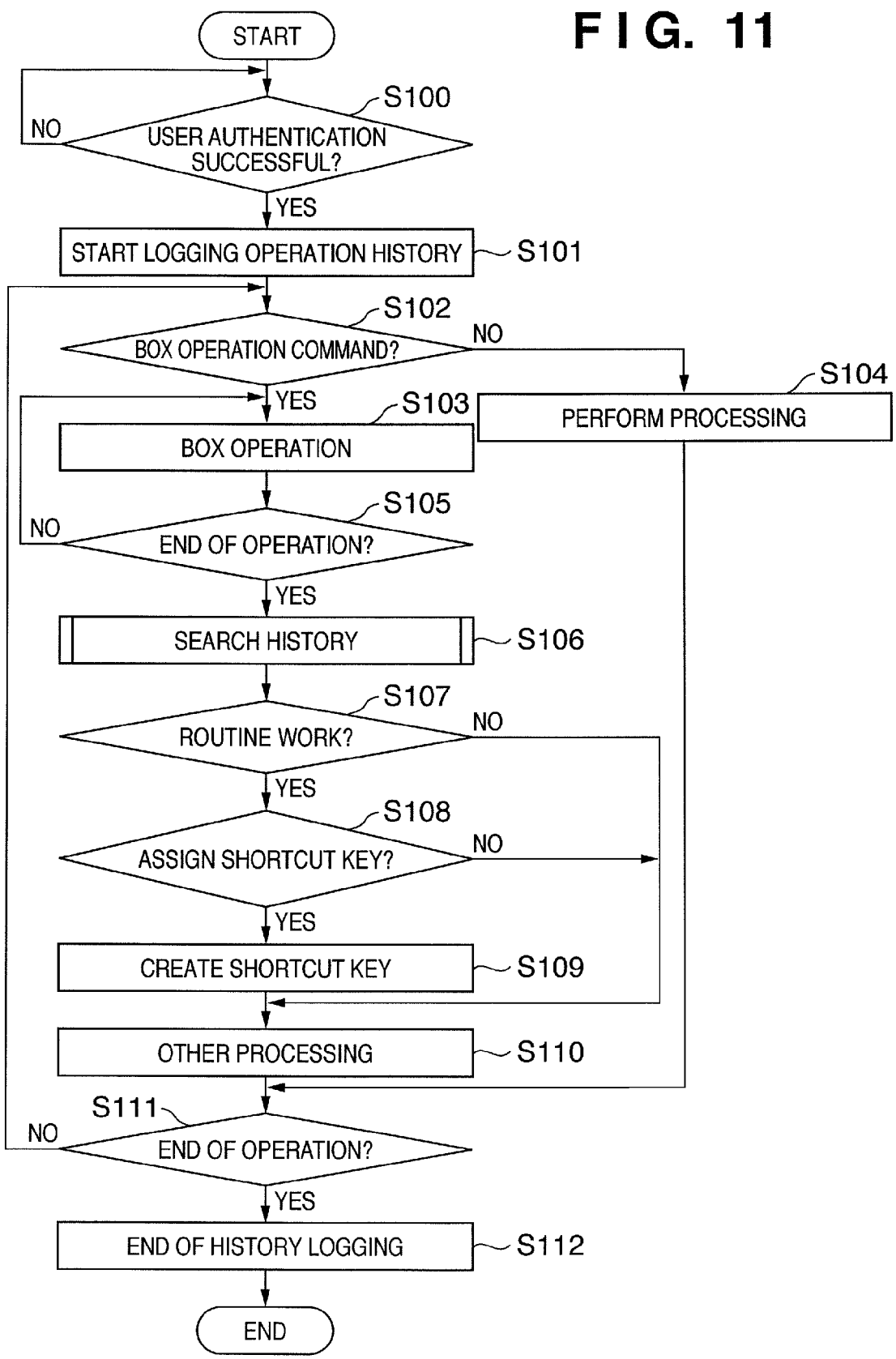
FIG. 11 is a flowchart illustrating a process performed in an image generating apparatus according to the first embodiment of the present invention.

FIG. 11 is a flowchart illustrating a process performed in the MFP 100 according to the first embodiment of the present invention. First, user authentication is performed (step S100). If the user authentication fails (No), then user authentication (step S100) is retried. On the other hand, if the user authentication is successful (Yes), logging of that user's operation history is started (step S101). Then, the process enters a user operation wait state and determination is made as to whether a box operation has been made (step S102).

If the user instructs the apparatus to perform operation such as copying or e-mail transmission or facsimile transmission, that is, an operation that is not a box operation (No), the operation is performed (step S104), then determination is made as to whether the operation has been completed (step S105). On the other hand, if the user instructs the apparatus to perform a box operation (Yes), then the box operation is performed according to the user's operation (step S103). Then, determination is made as to whether the box operation has been completed (step S105).

The box operation is performed unless the user issues a command to print or send by mail or fax a file contained in the box or to cancel the operation (No). On the other hand, if the user's command operation has been completed (Yes), the instructed operation is performed and the user's operation history is searched (step S106). In the operation history search processing at step S106, determination is made as to whether the user's operation is a routine operation performed in the past. In the example of the MFP 100 according to the first embodiment, the search process is performed as shown in FIG. 16.

Figure 16:
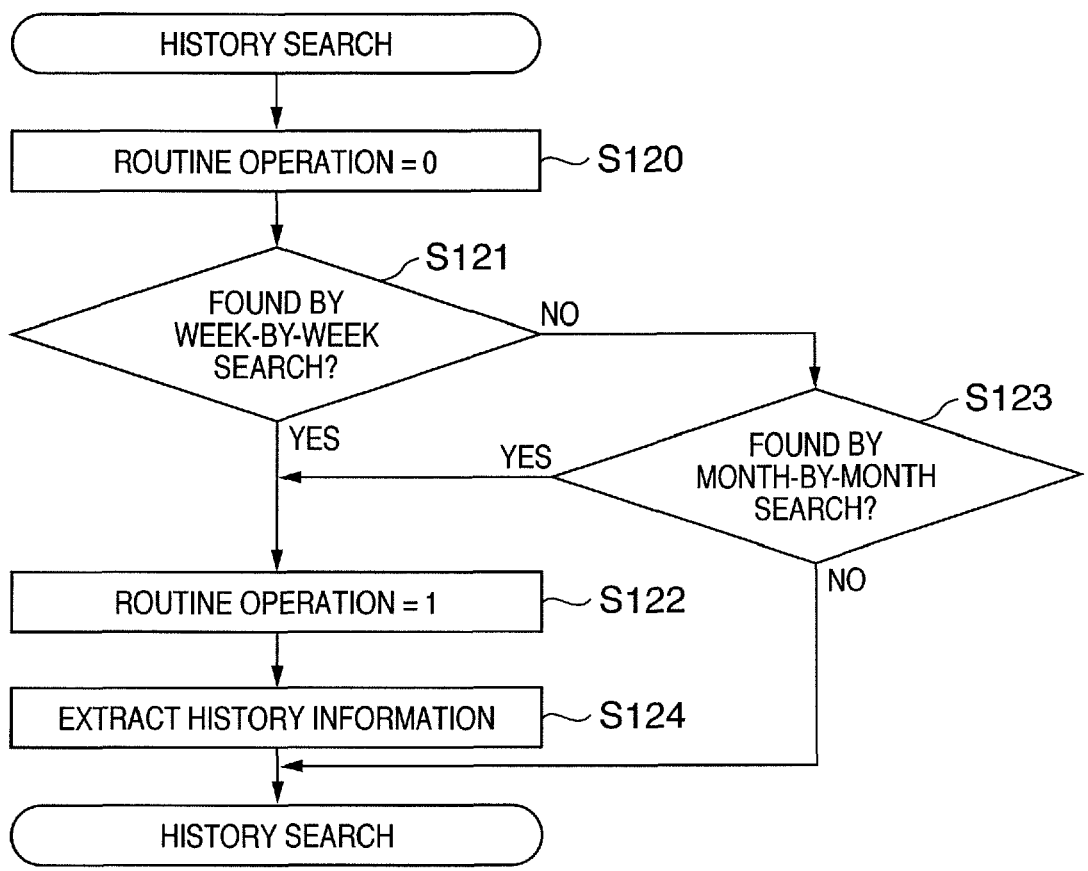
FIG. 16 is a flowchart detailing a history search processing (step S106) shown in FIG. 11.

FIG. 16 is a flowchart illustrating details of the history search processing (step S106) shown in FIG. 11. Initially, a flag internally used for indicating whether an operation is a routine operation is set to "0" (step S120). Then, the user's operation history is searched for the operation just performed by the user (step S121). In the first embodiment, operations performed by the user in the past are searched through week by week in reverse chronological order to check to see whether an operation similar to the operation just performed was performed by the user (step S121). In particular, the history is searched in reverse chronological order to see whether the MFP 100 was instructed by the user to perform the same operation in a given time period including the current time of day (for example a pre-specified time period such as "during the morning" or "within one hour either side of the current time of day"), by one week ago, by two week ago, and so on. That is, the past history is searched to determine whether an operation similar to the user's command operation was performed in the preset time period on the same day of the week on which the search is performed.

Each time a similar operation is found in the history (Yes), the routine work flag is set to "1" (step S122); otherwise (No), the search is performed month by month (step S123). As with the week-by-week search, the month-by-month search is performed in reverse chronological order through operations performed by the user to determine whether a similar operation was performed in the past, by one month ago, by two month ago, and so on.

The week-by-week search (step S121) and the month-by-month search (step S123) are performed with respect to the date column 2101, operation column 2103, and referenced box name column 2104 of the user's use history reference screen 2100 shown in FIG. 10. The box names at all levels in the box name column 2104 do not need to be match and only the top-layer box names may be searched through.

If the search at step S123 finds similar operations in the history information (Yes), then they are considered routine operations and the routine work flag is set to "1" (step S122). On the other hand, similar operations are not found by the search at step S123 (No), then the history search processing (step S106) will end.

In the MFP 100 in the first embodiment, an operation is considered a "routine work" if five occurrences of the operation are found. However, the number of occurrences may be a modifiable parameter that can be set on the MFP 100.

If step S121 results in "Yes", or if step 123 results in "Yes" and the user's operation is found to be a routine operation, then information in the history is extracted (step S124). The history information extraction processing at step S124 extracts information common to the occurrences of the operation from the description of the operation specified by the user, contained in the operation column 2103 of FIG. 10, the box names accessed by the user, contained in the referenced box name column 2104, and the file names accessed by the user, contained in the referenced file name column 2105. For the box names accessed by the user contained in the referenced box name columns 2104, only the common portion of the box name, starting form the top-level name, is extracted.

After the history search processing (step S106) described above, determination is made as to whether or not the user's operation is a routine work (step S107). If so (Yes), the user is asked whether the user wants to assign the user operation extracted by the history information extraction (step S124) to a shortcut key (step S108).

If the user instructs to create a shortcut key (Yes), then the shortcut key is created and registered (step S109). Items of information assigned to a shortcut key include information identifying the user who issued the instruction, the name of the file to be processed, or the box containing the file, in addition to settings for printing as described above (such as two-sided printing, 2 in 1 printing, and staple finishing). The shortcut key is displayed on a screen such as the one shown in FIG. 8 at a predetermined timing. For example, the shortcut key may be displayed when the user attempts to perform the routine work. For example, in the screen shown in FIG. 8, the shortcut key 1500 is displayed when the box mode key 1303 is pressed after successful user authentication. A shortcut key may be displayed at other timing. That is, the shortcut key 1500 may be displayed when the box "Regular meeting" is pressed, because the shortcut key 1500 is associated with an operation on a file in the box "Regular meeting". The shortcut key 1500 may also be displayed in response to selection of any of the files contained in the box "Regular meeting". The usability of a shortcut key can be further improved by allowing the user to specify the timing of displaying the shortcut key. Also, if it is determined as a result of week-by-week or month-by-month search that a user's operation command is a routine operation, a shortcut key may be displayed according to the determination. That is, if it is determined that a user's operation command is routinely performed on a given day of the week or month, then a shortcut key created may be displayed on that day of the week or month. In this case, the timing of displaying a shortcut key is not limited to a day of the week or month. For example, a shortcut key may be displayed in a predetermined time period of the day. On the other hand, if it is determined at step S107 that the user operation is not a routine work (No), or creation of the shortcut key is denied at step S108 (No), other operation is performed such as printing, sending by e-mail or fax, or cancel of the operation step (S110).

Then, determination is made as to whether the user has pressed a key such as the Personal identification key 1207, the power key 1201, or the energy saver key 1202 to indicate the end of the operation (step S111). If the user presses a button indicating the end of the operation (Yes), logging of the operation history instructed by the user will end and the image generating apparatus returns to the state in which it was before the authentication of the user (step S112). On the other hand, if the user instructs to perform other operation (No), the process returns to step S102, where that operation is performed.

While the operation history is searched week by week or month by month in the foregoing description, other form of search may be performed. For example, search may be performed through the operation history in a predetermined preceding period from the time at which the search is performed. In particular, an operation command may be considered a routine one if it is found that the operation command was issued more than 10 times in the preceding month.

As has been described, the MFP 100 according to the first embodiment is capable of automating assignment of keys to functions provided by the apparatus and registration of macros and appropriately presenting an index, such as a shortcut key, associated with such a registered function at the time when the user attempts to use the function. Furthermore, the apparatus is capable of determining whether the user operation is a routine operation and, if so, assigning the operation to a different, shortcut key. The apparatus is also capable of straightforwardly assigning the operation performed by the user to a shortcut key. These capabilities allow the user to use a shortcut key assigned to a operation that is likely to be performed by the user, without concern for the shortcut key and without needing to newly learn how to use the image generating apparatus. Thus, the ease-of-use of the image generating apparatus can be improved.

Second Embodiment

An MFP 100 according to a second embodiment of the present invention and a process performed in the apparatus will be described below in detail with respect to the accompanying drawings. The configuration of the MFP 100 according to the second embodiment is the same as that of the MFP 100 according to the first embodiment described above and therefore the description of which will be omitted.

Figure 12:
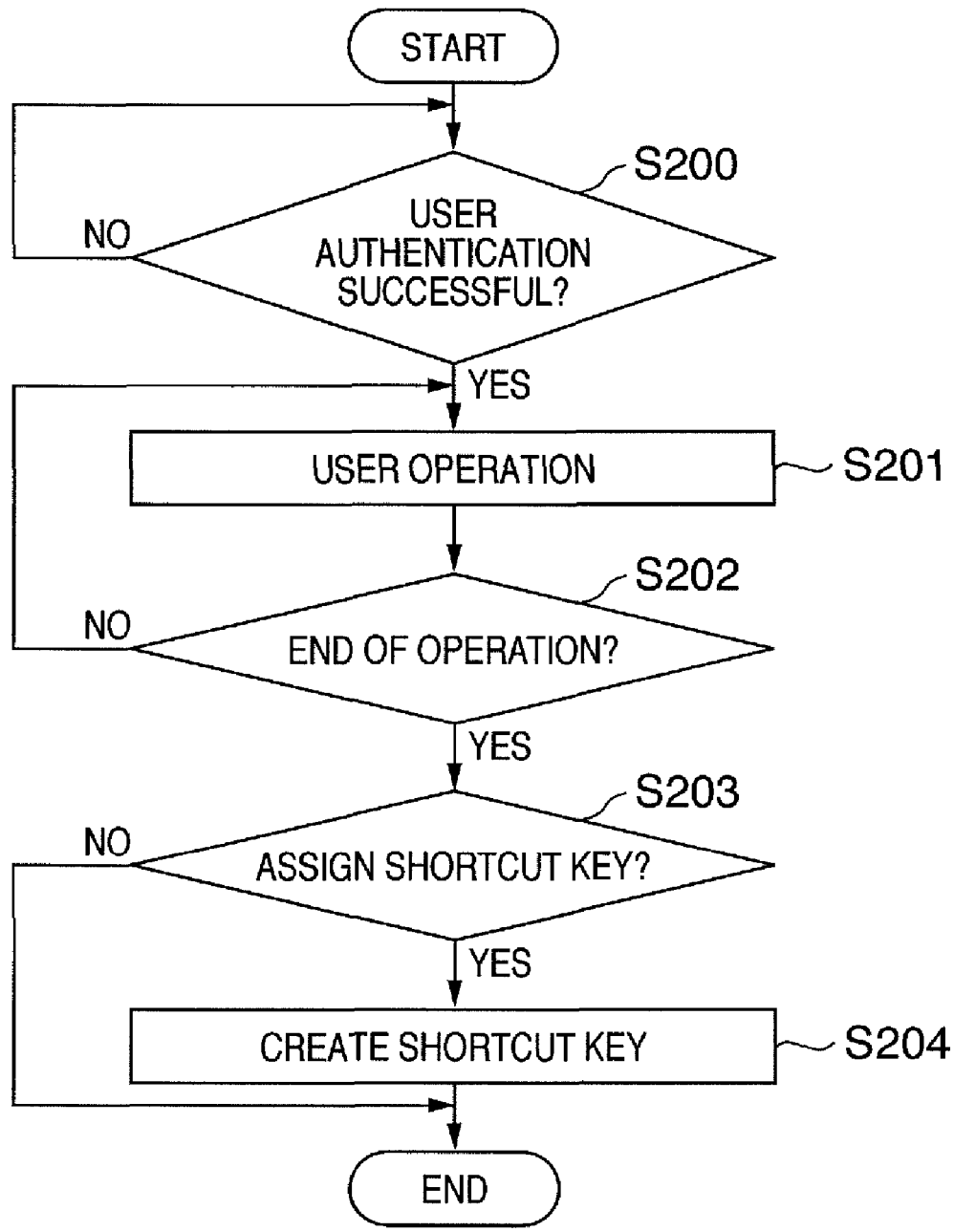
FIG. 12 is a flowchart illustrating a process performed in an image generating apparatus according to a second embodiment of the present invention.

FIG. 12 is a flowchart illustrating a process performed in MFP 100 according to the second embodiment of the present invention. In the MPP 100, user authentication is first performed (step S200). If the user authentication fails (No), the user authentication is retried. On the other hand, if the user authentication is successful (Yes), the image generating apparatus waits for a user operation. When a user instructs the image generating apparatus to perform an operation such as copying or sending by mail or fax, or box operation, the specified operation is performed according to the instruction (step S201).

Then, determination is made as to whether the user has pressed a key, such as the Personal identification key 1207, the power key 1201, or the energy saver key 1202, that indicates the end of operation (step S202). If the end of operation is indicated (Yes), the user is asked whether the user wants to assign the user operation to a shortcut key (step S203). On the other hand, if the user instructs the image generating apparatus to perform other operation at step S202 (No), the process returns to step S201, where the user operation is performed.

If the user instructs the image generating apparatus to create a shortcut key at the shortcut key registration step (step S203: Yes), then the shortcut key is created (step S204). On the other hand, if the user denies creation of the shortcut key (No) at step S204, the process will end.

Figure 13:
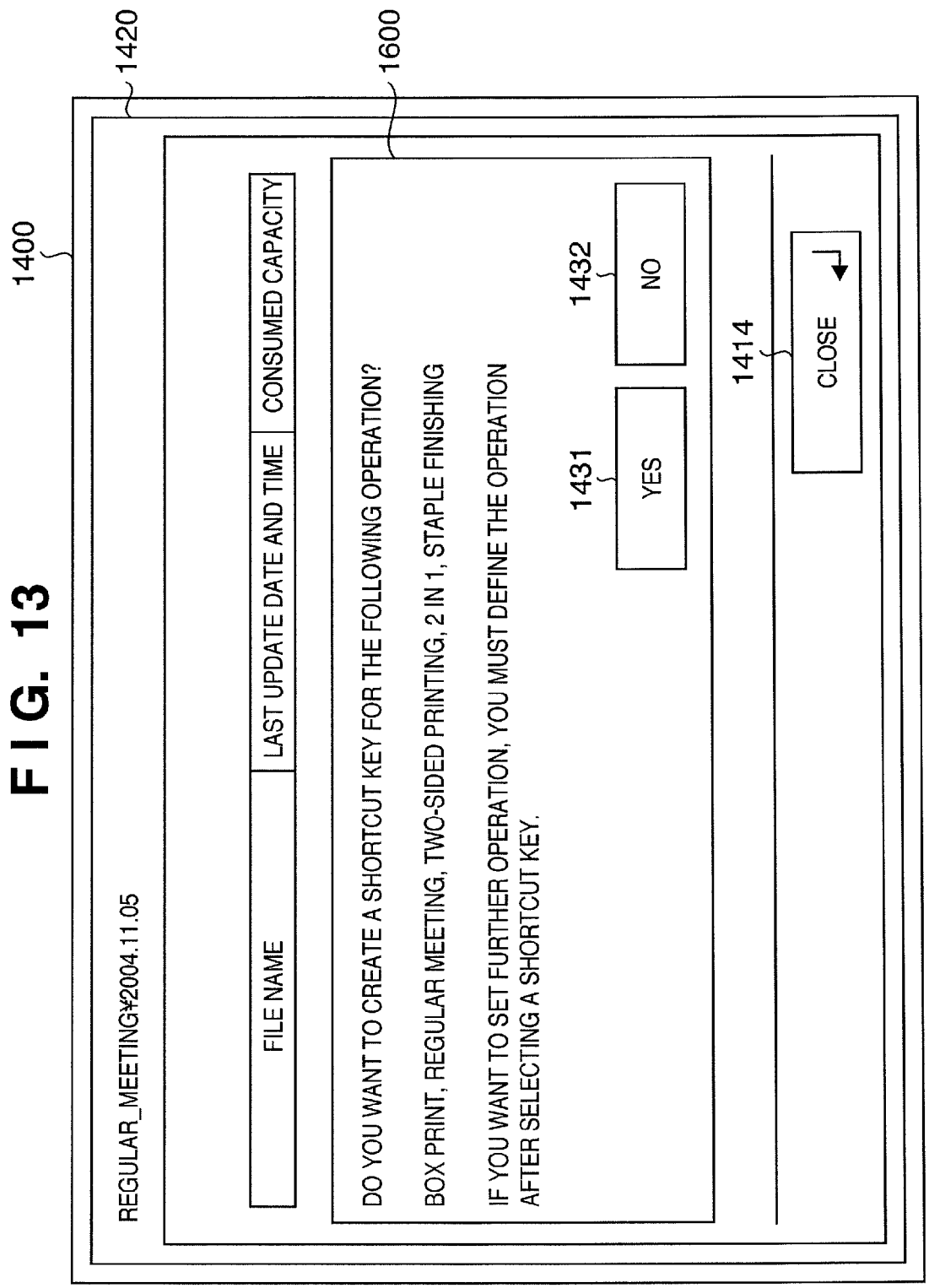
FIG. 13 shows an exemplary configuration of a screen for confirming the creation of a shortcut key according to the second embodiment of the present invention.

FIG. 13 shows an exemplary configuration of a screen for confirming shortcut key creation according to the second embodiment of the present invention. The shortcut key creation confirmation screen 1600 in FIG. 13 is displayed for asking a user whether to assign to a shortcut key an operation that the user instructed the apparatus to perform. For example, if the user wants to create the shortcut key, the user presses the "Yes" key 1431; otherwise, the user presses the "No" key 1432.

The MFP 100 according to the second embodiment asks the user whether the user wants to register a shortcut key for an operation performed on the MFP 100 by the user on completion of that operation, thereby allowing the user to readily register a shortcut key as needed and improving the ease-of-use of the MFP 100.

Other Embodiments

Embodiments of the present invention have been described in detail above. The present invention can be embodied as a system, an apparatus, a method, a program, or a storage medium (recording medium), for example. Specifically, the present invention can be applied to a system consisting of multiple devices or a standalone apparatus consisting of a single device.

It should be noted that the present invention includes implementations achieved by directly or remotely providing a software program that implements any of the embodiments described above (a program corresponding to any of the flowcharts shown in the drawings in the embodiments) to a system or an apparatus and reading and executing the provided program code by a computer of the system or apparatus.

Therefore, the program code itself that is installed in a computer in order to implement the functions and processing of the present invention also implements the present invention. That is, the present invention includes a computer program for implementing the functions and processing of the present invention.

The computer program may take any form that has capabilities of a program, such as an object code, a program to be executed by an interpreter, or script data to be provided to an operating system.

The recording medium for providing the program may be a floppy (registered trademark) disk, a hard disk, an optical disk, a magneto-optical disk (MO), a CD-ROM, a CD-R, a CD-RW, a magnetic tape, a non-volatile memory card, a ROM, a DVD (DVD-ROM or DVD-R) or the like.

The program of the present invention can also be provided to a computer by connecting to a Web page on the Internet through a browser on the client computer and downloading from the Web page the computer program itself or a compressed file including an automatic install function into a recording medium such as a hard disk. The present invention can also be implemented by dividing a program code embodying the present invention into files and allowing each of the files to be downloaded from a different Web page. This means that the present invention also includes a WWW server that allows multiple users to download program files for implementing by computer the functions and processing of the present invention.

The present invention also can be implemented by delivering an encrypted program of the present invention in a storage medium such as a CD-ROM to users and allowing any of the users who satisfy predetermined conditions to download encryption key information for decrypting the encrypted program through the Internet and to use the encryption key information to install and execute the encrypted program.

The functions of the embodiments described above can be implemented not only by a computer reading and executing the program, but also by processing by an operating system running on a computer and performing part or all of actual processing in accordance with commands of the program.

Furthermore, the program read from a recording medium can be written in a memory provided in a function expansion board inserted in a computer or in a function expansion unit attached to a computer, then a component such as a CPU contained in the function expansion board or the function expansion unit can perform part or all of actual processing in accordance with instructions of the program, and thereby the functions of the embodiments described above can be implemented.

As has been described above, assignment of keys to functions and registration of macros provided by an image generating apparatus can be automated and an index such as a shortcut key associated with any of the registered functions can be presented to a user at the time when the user uses the functions.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-044459, filed on Feb. 21, 2005 which is hereby incorporated by reference herein in its entirety.

What is claimed is:

1. An information processing apparatus which performs processing in accordance with one or more operation commands from a user, comprising:
   a receiving unit constructed to receive an operation command for instructing a plurality of processes from the user;
   a determining unit constructed to determine whether or not the operation command received by said receiving unit has been issued at certain fixed intervals a predetermined number of times or more in a predetermined time interval;
   a querying unit constructed to query the user whether or not to register an index for executing the plurality of processes instructed by the operation command received by said receiving unit when it is determined by said determining unit that the operation command has been issued at the certain fixed intervals a predetermined number of times in the predetermined time interval;
   a registering unit constructed to register the index for executing the plurality of processes when the user responds to the query by said querying unit to register the index;
   a display control unit constructed to cause a display unit (i) to display the index registered by said registering unit at the certain fixed intervals, and (ii) not to display the index registered by said registering unit at other times; and
   an executing unit constructed to execute the plurality of processes corresponding to the index when the user designates the index displayed on the display unit.

2. The information processing apparatus according to claim 1,
   wherein said registering unit is capable of respectively registering indexes for executing different pluralities of processes, and
   wherein the display control unit causes the display unit to display each of the indexes at a timing preset for each of the indexes.

3. The information processing apparatus according to claim 1,
   further comprising a printing unit configured to perform print processing,
   wherein the operation command specifies contents of the print processing to be performed by the printing unit.

4. The information processing apparatus according to claim 3, wherein the specified contents of the print processing include at least any of multi-page printing for printing a plurality of pages on one sheet of recording medium, two-sided printing, and staple finishing.

5. The information processing apparatus according to claim 1, further comprising;
   a storing unit configured to store history information concerning one or more operation commands which have been performed, each for instructing a plurality of processes; and
   a detecting unit configured to detect history information relating to the operation command received by said receiving unit,
   wherein said determining unit performs the determination based on the operation command received by said receiving unit and the history information detected by said detecting unit.

6. The information processing apparatus according to claim 5, wherein said detecting unit detects history information relating to the operation command received by said receiving unit from among history information of a predetermined time period stored in the storing unit.

7. A method for controlling an information processing apparatus, comprising the steps of:
   receiving an operation instruction for instructing a plurality of processes from a user;
   determining whether or not the operation instruction received in said receiving step has been issued at certain fixed intervals a predetermined number of times in a predetermined time interval;
   querying the user whether or not to register an index for executing the plurality of processes instructed by the operation instruction received in said receiving step when it is determined in said determining step that the operation instruction has been issued at the certain fixed intervals a predetermined number of times in the predetermined time interval;
   registering the index for executing the plurality of processes when the user responds to the query made in said querying step to register the index;

controlling a display unit (i) to display the index registered in said registering step at the certain fixed intervals, and (ii) not to display the index registered in said registering step at other times; and executing the plurality of processes corresponding to the index when the user designates the index displayed on the display unit.

8. A non-transitory computer readable medium storing a program for causing a computer to perform processing in accordance with one or more operation commands from a user, said processing comprising the steps of:

receiving an operation command for instructing a plurality of processes issued from the user to the computer;

determining whether or not the operation command received in said receiving step has been issued at certain fixed intervals a predetermined number of times in a predetermined time interval;

querying the user whether or not to register an index for executing the plurality of processes instructed by the operation command received in said receiving step when it is determined in said determining step that the operation command has been issued at the certain fixed intervals the predetermined number of times in the predetermined time interval;

registering the index for executing the plurality of processes when the user responds to the query made in the querying step to register the index;

controlling a display unit (i) to display the index registered in said registering step at the certain fixed intervals, and (ii) not to display the index registered in said registering step at other times; and executing the plurality of processes corresponding to the index when the user designates the index displayed on the display unit.

* * * * *